(12) United States Patent
Schmaelzle et al.

(10) Patent No.: US 6,443,520 B1
(45) Date of Patent: Sep. 3, 2002

(54) MULTIPART SUN ROOF FOR A MOTOR VEHICLE

(75) Inventors: Manfred Schmaelzle, Boennigheim; Peter Thomas, Pforzheim; Jan Roth, Stuttgart, all of (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/654,904

(22) Filed: Sep. 5, 2000

(30) Foreign Application Priority Data

Sep. 3, 1999 (DE) .......................... 199 41 984

(51) Int. Cl.7 ................................. B60J 10/12
(52) U.S. Cl. .................. 296/216.08; 296/216.03; 296/220.01; 296/217
(58) Field of Search ............. 296/216.06–216.08, 296/216.03, 216.05, 217, 220.01

(56) References Cited

U.S. PATENT DOCUMENTS

| | | | |
|---|---|---|---|
| 5,031,959 A | 7/1991 | Queveau | |
| 5,197,779 A | * 3/1993 | Mizuno et al. | 296/220.01 |
| 5,540,478 A | * 7/1996 | Schuch | 296/216.08 X |
| 5,833,305 A | * 11/1998 | Watzlawick et al. | 296/217 |
| 6,129,413 A | * 10/2000 | Klein | 296/220.01 |
| 6,270,154 B1 | * 8/2001 | Farber | 296/220.01 X |

FOREIGN PATENT DOCUMENTS

| | | | |
|---|---|---|---|
| DE | 3828062 | * 3/1989 | 296/217 |
| DE | 42 27 400 | 2/1994 | |
| DE | 19851366 | 5/1999 | |
| DE | 29820613 | 5/2000 | |
| EP | 0 648 629 | 4/1995 | |
| GB | 573355 | * 11/1945 | 296/220.01 |
| WO | WO 96/01192 | 1/1996 | |

* cited by examiner

Primary Examiner—Dennis H. Pedder
(74) Attorney, Agent, or Firm—Crowell & Moring LLP

(57) ABSTRACT

A multipart sun roof for a motor vehicle is proposed which comprises a first roof section which can be moved at an angle and at least a second and a third roof section that can be longitudinally displaced in the longitudinal direction of the vehicle for positioned closing and releasing of a roof opening. Adjacent to these movable roof sections, a permanently mounted fourth roof section is provided, wherein the roof sections which can be moved longitudinally are arranged in guide rails and their displacement is controlled by means of control, displacement, and operating elements.

21 Claims, 7 Drawing Sheets

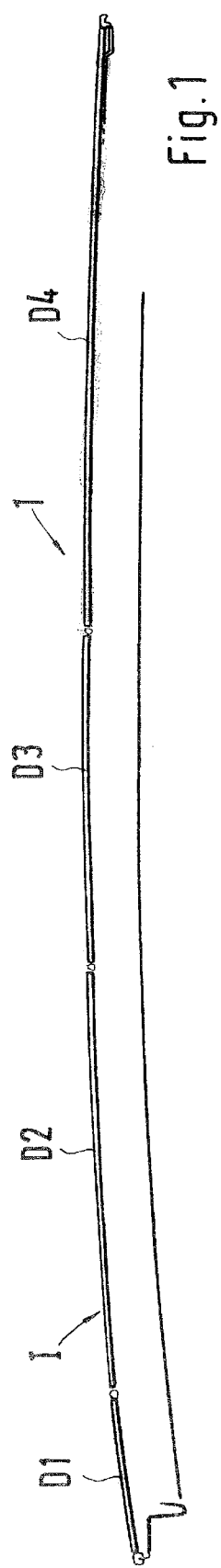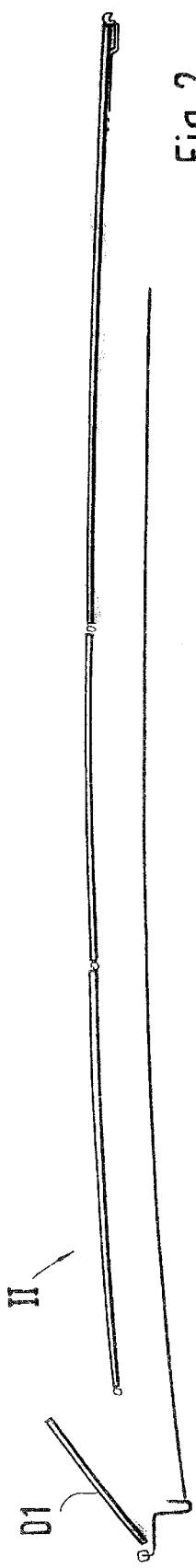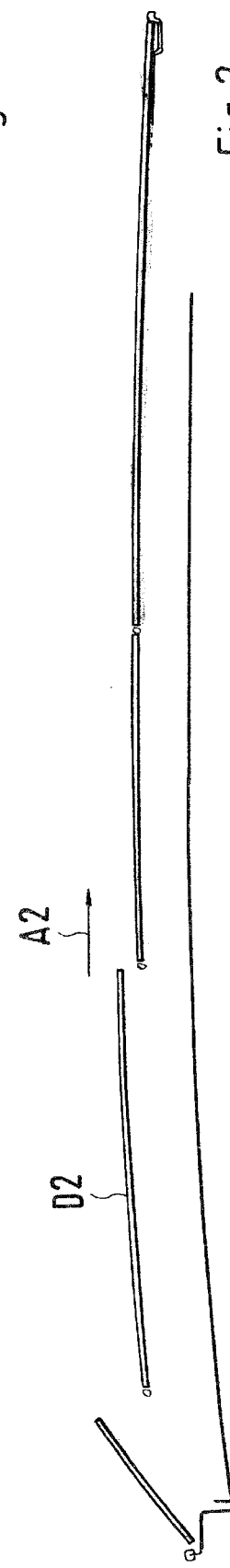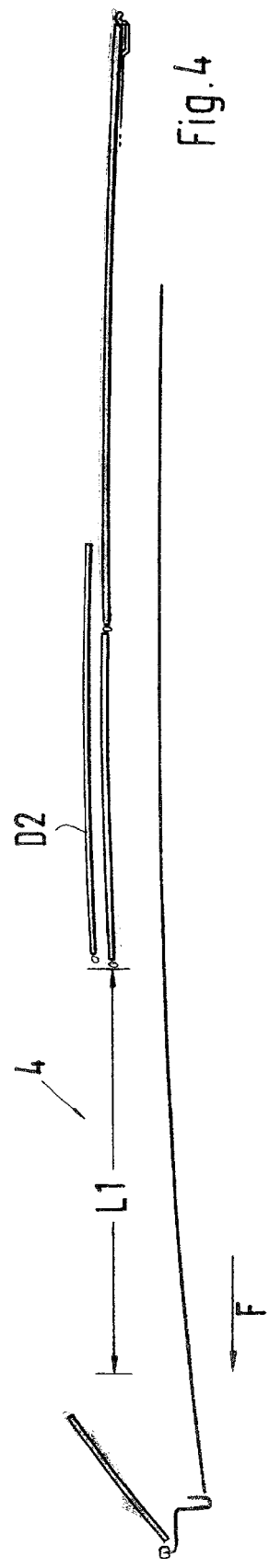

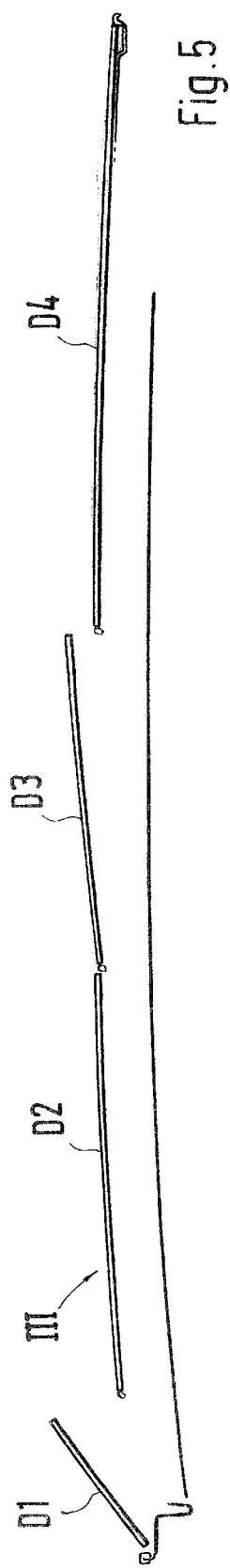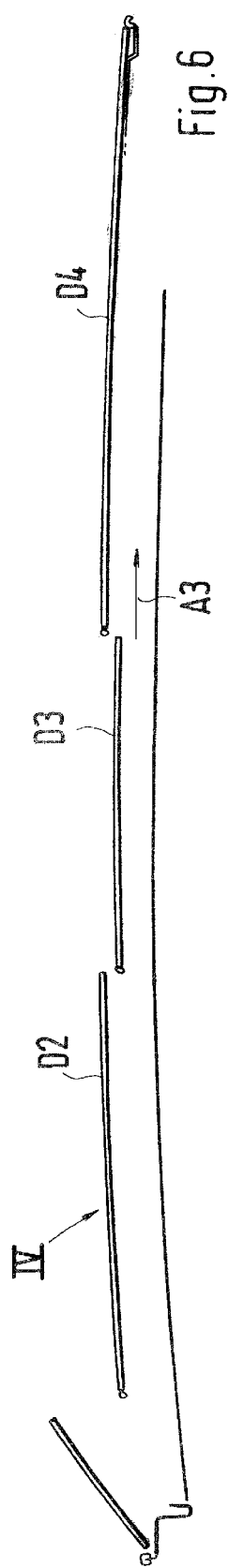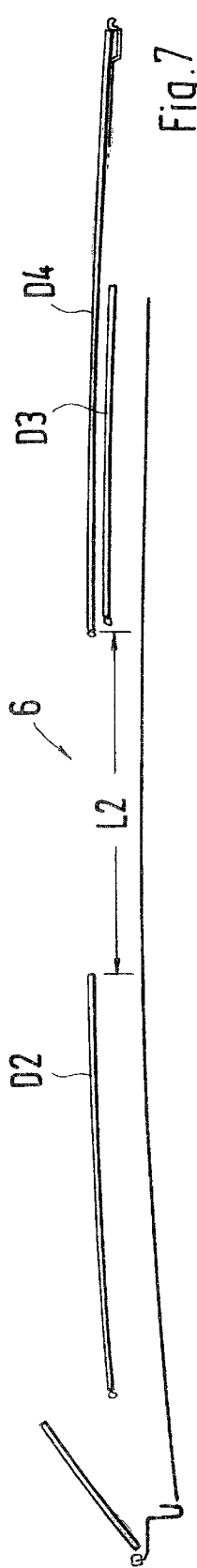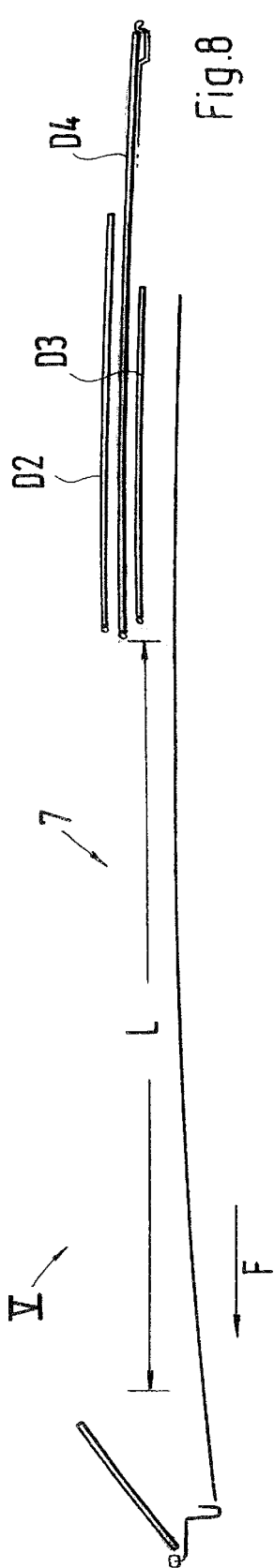

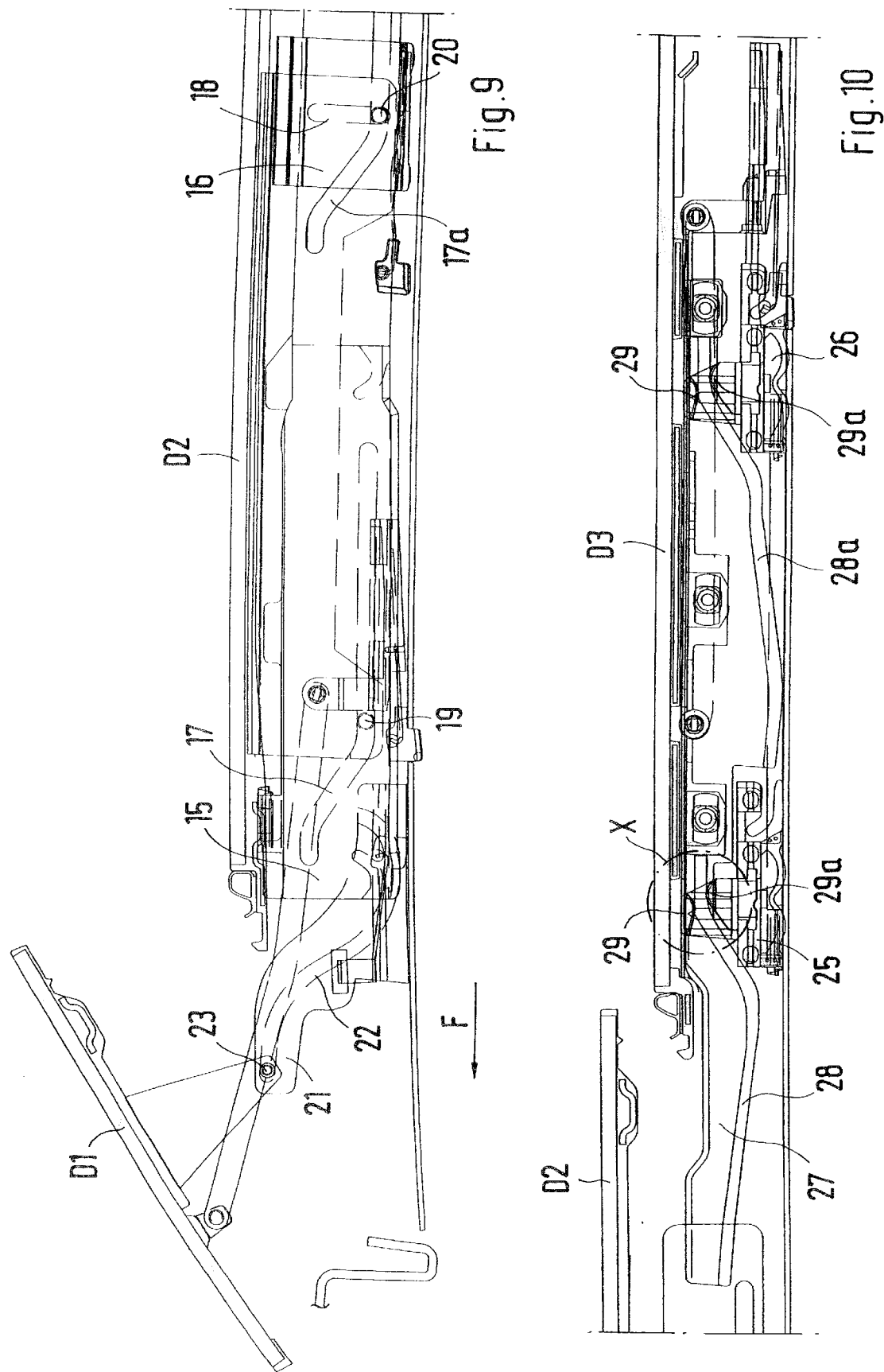

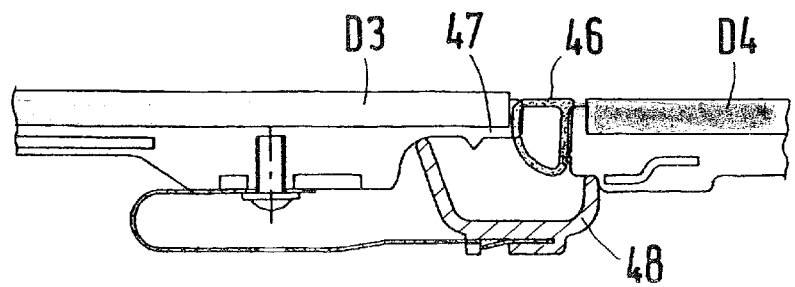
Fig. 18
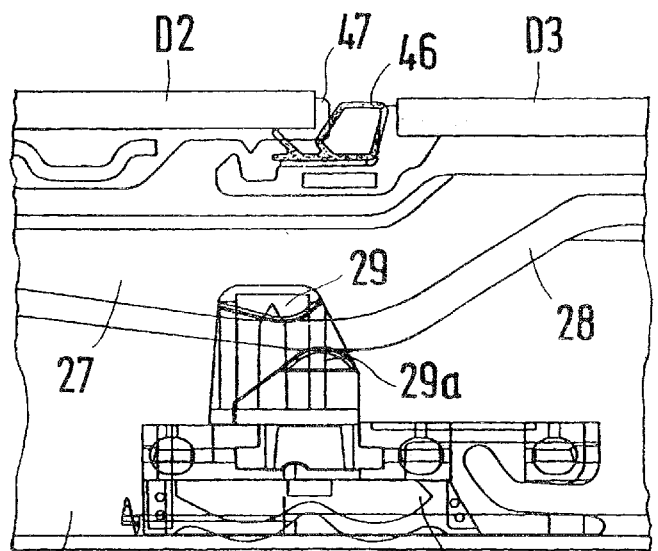
Fig. 19
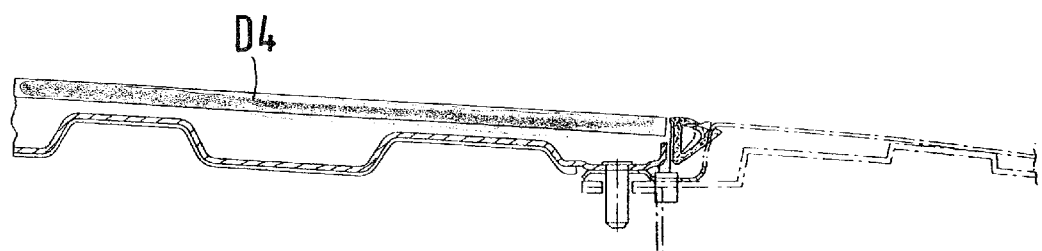
Fig. 20
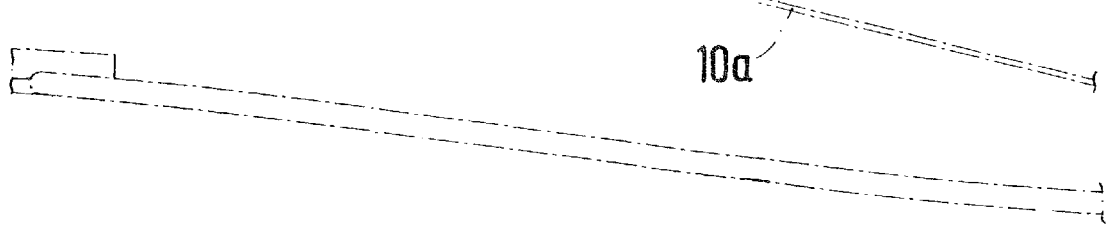

MULTIPART SUN ROOF FOR A MOTOR VEHICLE

BACKGROUND AND SUMMARY OF THE INVENTION

This application claims the priority of German patent document 199 41 984.1, filed Sep. 3, 1999, the disclosure of which is expressly incorporated by reference herein.

This present invention concerns a multipart sun roof for a motor vehicle comprising a first roof section which can be moved at an angle, second and third movable roof sections that can be longitudinally displaced in a longitudinal direction of the vehicle for positioned closing and releasing of a roof opening, and a permanently mounted fourth roof section adjacent to these movable roof sections, with displacement of the longitudinally displaceable roof sections being controllable by control, displacement, and operating elements.

German Patent Document DE 42 27 400 C2 describes a sun roof for vehicles with at least two roof sections that are displaceable in the longitudinal direction of the vehicle and which can alternatively be used for closing or at least partially releasing a continuous roof opening in a fixed roof panel. In their closed position, the two roof sections are arranged successively and at least approximately flush with the contour of the fixed roof panel. One of the two roof sections is guided in a displaceable manner along the longitudinal direction of the vehicle in a guide system disposed on the inside of the roof. The other roof section is guided in a displaceable manner along the longitudinal direction of the vehicle in a guide system disposed on the outside of the roof in such a manner that it can be moved from the closed position, wherein it is approximately flush with the contour of the fixed roof panel, into an opening position wherein it comes to rest entirely above the roof panel.

Furthermore, a glass roof is known from European Patent Document EP 0 648 629 B1 which is disposed between lateral roof frames and which comprises a longitudinally displaceable roof section and a further roof section which forms an extension of the first roof section. Between the roof frames, a first angular movable roof section is located adjacent to the first windscreen frame, which is followed by a second roof section which forms the longitudinally movable roof section and in whose extension a third permanently mounted roof section is provided which forms the further roof section.

Furthermore, WO 96/01192 describes a sun roof with two front roof sections that are approximately equally long and longitudinally displaceable—with respect to the driving direction—and a rear fixed roof section. The first front roof section can be displaced at an angle and moved into an angular position above the rear permanently mounted roof section. The second front roof section is displaceable in a position below the permanently mounted rear roof section.

The second front roof section is displaceable in a position above the permanently mounted rear fixed roof section.

An object of this present invention is to create a multipart sun roof for a motor vehicle, in particular for an off-road vehicle, which provides a plurality of opening and closing options and wherein both a small opening of the roof in different roof sections as well as a relative large opening of the roof can be achieved. In addition, the individual roof sections shall be supported and guided in roof rails in a stable manner. Furthermore, the exterior roof contours, in case the roof is closed, should be provided as a continuous even surface, and any guide systems projecting beyond the roof contours are to be avoided.

According to this present invention, this object is met by providing a multipart sun roof for a motor vehicle comprising a first roof section which can be moved at an angle and at least a second and a third roof section that can be longitudinally displaced in the longitudinal direction of the vehicle for positioned closing and releasing of a roof opening as well as a permanently mounted fourth roof section adjacent to these movable roof sections, with displacement of the longitudinally displaceable roof sections being controllable by means of control, displacement, and operating elements, characterized in that the first roof section can be displaced at an angle with respect to a positioned movable second or third roof section and the two following roof sections can be displaced both individually and independently from each other as well as successively into a release and closing position by means of links that are displaceable in guide rails as well as control elements in such a way that the second and the third roof section each are arranged in a longitudinally displaceable manner in the guide rails to form their respective roof openings and, as a result thereof, both roof sections together release the entire roof opening, and at least one movable roof section or both roof sections can be displaced at an angle in the closing position.

Further advantageous features of preferred embodiments are described below and in the claims.

Principal advantages achieved by this present invention are that the guide rails that are connected with the lateral roof side rails and covered for the longitudinally displaceable roof sections, in case the roof is closed, provide a flush outside surface without any projecting guide system. For that purpose, between the lateral rails of the vehicle roof of the body structure, guide rails are provided which comprise one or several receiving chambers for displacement and control and/or operating elements of the three front roof sections—with respect to the driving direction of the vehicle—and which are provided so that they are covered under an outside roof contour. Each of these guide rails is connected with the lateral rails of the body structure in such a manner that the receiving chambers are arranged in the guide rails to laterally position the roof sections in a permanently mounted manner, e.g. next to each other in a horizontal plane.

The entire roof module, essentially comprising the roof sections with guide rails as well as the displacement and control and/or operating elements and further elements and/or devices belonging to the operational roof element, such as e-motors and the like, is mounted in a prepared roof opening of the body structure of the vehicle and secured on the same, e.g. by means of fastening screws or bolting or by using another connecting procedure.

The guide rails are preferably such that on the outside profile of the guide rail, a bridge extending approximately horizontally and projecting towards the outside of the vehicle is provided which can be connected with at least one lateral rail of the vehicle body structure by means of screws. Replacing the entire roof module for repairs or in the case of damage is also possible in a simple manner.

To provide a plurality of roof opening options, the movable roof sections can be displaced and tilted in such a way that at least the first roof section can be displaced at an angle once a movable second or third roof section is displaced. Both roof sections can be displaced both individually and independently from each other as well as successively by means of links and control elements that are displaceable within the guide rails into an opening and a closing position. Both the second and the third roof sections can be arranged in a longitudinally displaceable manner in the guide rails so as to release its respective roof opening, and both roof sections, can also be arranged in a longitudinally displaceable manner in the guide rails so as to together release the entire roof opening. At least one movable roof section or also both roof sections can be positioned at an angle in their closing position.

To make the individual roof sections longitudinally displaceable between the lateral roof rails, the guide rail is characterized by two profiles whose cross sections are approximately U-shaped, wherein the outside profile has a first chamber to receive the guide and control and/or operating elements for the first and the second roof section as well as to support the fourth roof section via holding and fastening means.

The inside profile of the guide rail has a second chamber to receive the guide and control and/or operating elements for the third roof section as well as a guide system for a roll-up sun screen and a receiving area for fastening of a roof paneling. As a result, the costly molding and forming of profiles is avoided since this guide system for the roll-up sun screen and the receiving structure for the fastening of the roof paneling is integrated in the guide rail.

The longitudinal displaceability of the individual roof sections is ensured in that, in the outside profile of the guide rail, the link for the first roof section and for the second roof section as well as in circular guide systems, operating ropes are arranged in a longitudinal displaceable manner. Into the guide slots of the link, link pins connected with the roof section engage, as a result of which a successive movement of the roof sections can be achieved in a simple manner once the link is moved.

In the inside profile of the guide rail, two sliding elements permanently mounted connected with each other are arranged in a longitudinally displaceable manner which engage in guide systems of a control element connected to the third roof section. These guide systems make it possible to use the sliding and/or the control elements to move the roof from a lifting position to a longitudinal displacement position.

By controlling the movable roof sections by means of the links and/or the control elements which, according to the desired sequence of movement, are provided with guide slots and/or guide systems in which link pins and/or control elements connected to the roof section engage, in a first opening position, the second front roof section—with respect to the driving direction—can then be released behind the wind deflector plate of a roof opening, as described below:

Once the second roof section is released, the second roof section is lifted vertically upwards, followed by a longitudinal motion against the driving direction, as a result of which the second roof section can assume a position above the third roof section, and this third roof section remains flush with the permanently mounted fourth roof section. The second roof section can also be positioned over the fourth roof section.

In a second opening position, in case the third roof section is released, the third roof section is lifted vertically upwards, followed by a longitudinal motion against the driving direction, as a result of which the third roof section can be moved under the permanently mounted fourth roof section. The second roof section remains flush with the forth roof section.

In a third possible opening position, the second and the third roof sections are moved together over and under the permanently mounted fourth roof section, wherein the front end edges of all three roof sections are superimposed in an approximately vertical plane.

The roof sections are closed by reversing the steps described for opening the roof sections.

The first roof section is provided as a so-called wind deflector plate which is much narrower than the other movable roof sections. In particular, the roof sections are all different in length in such a way that the first roof section provided in the front as a wind deflector plate is shorter than all of the other roof sections, and the second roof section is longer than the third roof section.

The roof sections are preferably made from a transparent material, although they can also consist of a non-transparent material. It is also contemplated, however, to combine transparent and non-transparent roof sections.

To ensure absolute sealing between the areas of the end edges, the roof sections are provided with opposite sealing strips, with one sealing strip having an elastic hollow chamber profile and its opposite sealing strip having an elastic solid profile. Beneath the hollow chamber profile, a carrier profile provided with a transversal channel can be connected with the roof section. Other elastic profiles are also contemplated.

In addition, lateral seals are provided which, on the projecting side of the outside profile of the guide rail, in particular on its free end, has a chamber profile seal facing the lateral edges of the roof sections, wherein such chamber profile seal can be pushed aside by the link pins in the area of the passing holding element permanently mounted on the roof.

The guide rail has the advantage that, on one hand, guide tracks are provided for the displaceable roof sections beneath the roof contour and approximately at the height of the roof rails. In addition, the guide rails integrate all mechanisms and devices for displacement of the roof sections. Furthermore, mounting on the lateral rails is performed via the guide rail, and lateral seals as well as guide systems for the roll-up sun screen and a receiving area for the roof paneling are also provided on the rail. The guide rail has an almost flat and even underside and little width and extends transversally to the longitudinal direction of the vehicle, as a result of which the size of the roof opening and the passenger room conditions are not adversely impacted in a significant manner.

Other objects, advantages and novel features of the present invention will become apparent from the following detailed description of the invention when considered in conjunction with the accompanying drawings.

BRIEF DESCRIPTION OF THE DRAWINGS

FIGS. 1–8 schematically represent the possible closing and opening positions of the roof sections of the multipart sun roof constructed according to a preferred embodiment of the present invention;

FIG. 9 is a schematic lateral sectional view onto the first and partially onto the second roof section, with a link for the first roof section and links for the second roof section;

FIG. 10 is a schematic lateral sectional view onto the third roof section, including control and sliding elements;

FIG. 18 is a side view as shown in FIG. 17, with the third roof section in a closed position;

FIG. 19 is an enlarged representation X as per FIG. 10 of the roof-side control element, including sliding elements; and FIG. 20 shows a section through a rear-side transversal roof rail connected with the permanently mounted rear roof section.

DETAILED DESCRIPTION OF THE DRAWINGS

Figure 11:
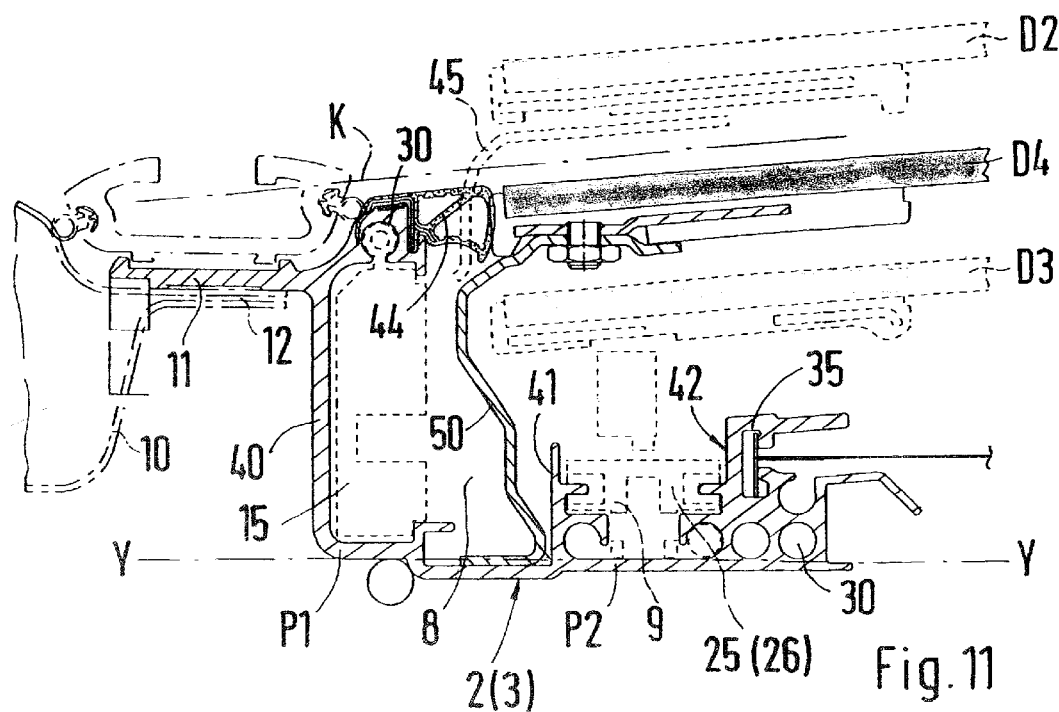
FIG. 11 is a section through a guide rail with an indicated link for the second roof section and an indicated sliding assembly with a control element for the third roof section.

A multipart sun roof 1 for a motor vehicle and/or for an off-road vehicle comprises a plurality of roof sections D1, D2, D3, D4. The first roof section D1 is preferably provided as a wind deflector plate and can be displaced at an angle. The two following roof sections D2 and D3 are arranged in a longitudinally displaceable manner in lateral guide rails 2, 3. After these two roof sections D2 and D3, a permanently mounted rear roof section D4 is provided. The entire assembly of the multipart sun roof 1 consists of a functional module and is mounted in a prepared roof opening of the vehicle and secured in the same by means of screws and the like.

The longitudinally displaceable roof sections D2 and D3 can assume different opening and closing positions I through V, as shown in more detail in FIGS. 1 through 8.

FIG. 1 shows the sun roof 1 with the first three displaceable roof sections D1, D2, and D3 in closed position I. It is possible to lift the first roof section D1 upward at an angle while the following roof sections D2 and D3 remain closed. It is also possible to open and/or tilt the first roof section D1 while the second and/or third roof sections D2 and/or D3 remain approximately or fully closed. The two following movable roof sections D2 and D3 can be moved into a releasing and closing position individually and independently from each other.

As shown in more detail in FIG. 3, the second roof Section D2, after longitudinal displacement in the direction of the arrow A2, can release its roof opening 4 with a length L1. By the same token, the third roof section D3, after longitudinal displacement in the direction of the arrow A3 (FIG. 6), can release its roof opening 6 with a length L2. Furthermore, the two displaceable 40 roof sections D2 and D3 can be displaced backwards against the driving direction F, creating a roof opening 7 with the length L which corresponds to the length of both roof sections D2 and D3.

The first roof section D1 can only be tilted at an angle; preferably, this roof section D1 is only tilted upward in case one of the two roof sections D2 and D3 is moved in any fashion. It is also conceivable that angular tilting of the first roof section D1 is controlled as the roof sections D2 and/or D3 are moved.

Angular tilting of the third roof section D3 is shown in more detail in FIG. 5. It is also possible, however, that both roof sections D2 and D3 or one of the two roof sections D2, or D3 are tilted at an angle.

Figure 14:
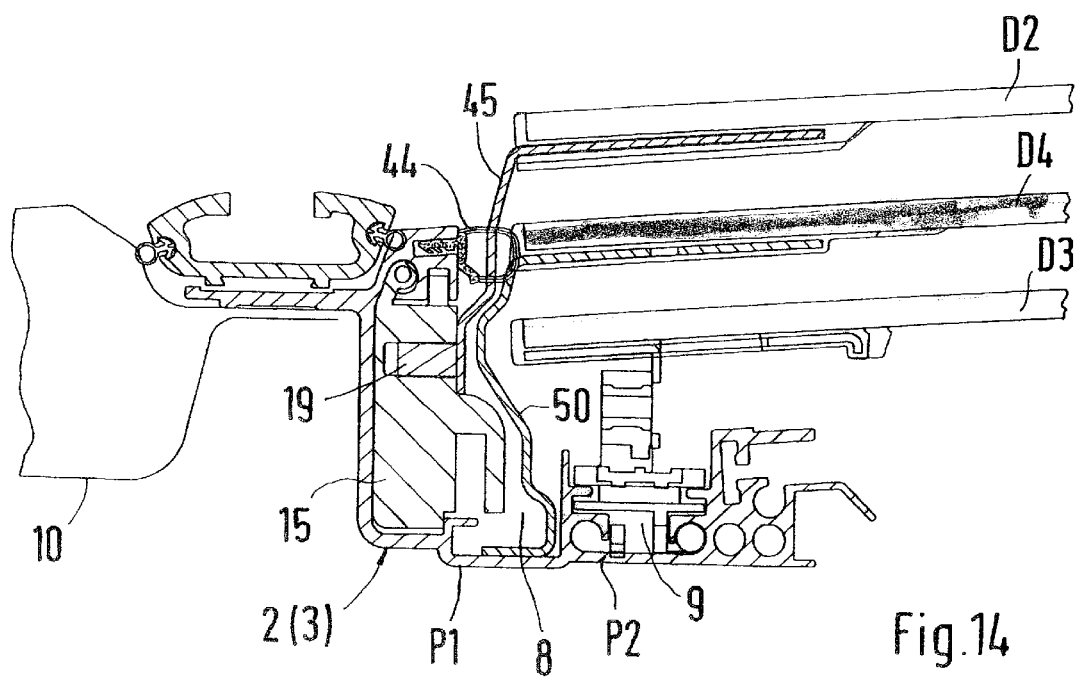
FIG. 14 is a section through the guide rail, including a representation of the link for the front roof section as well as guiding connections of the link via a link pin.
Figure 15:
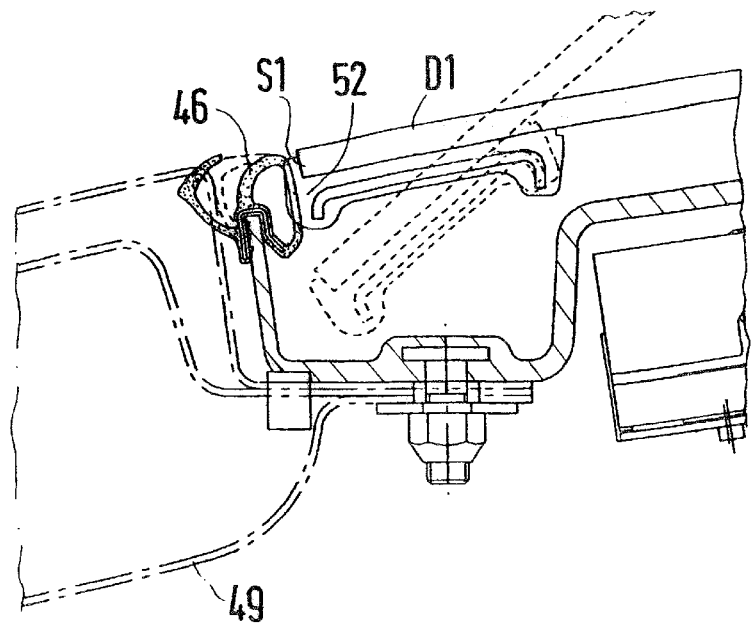
FIG. 15 is a section through a front transversal roof rail and through the first roof section with a front side seal.

To permit opening of the movable roof sections D2 and D3 and moving them over and under the permanently mounted roof section D4 in a simple manner, each of the lateral guide rails 2, 3 is provided with two U-shaped profiles P1 and P2 each with receiving chambers 8 and 9 for displacement and control and/or operating elements of the roof sections D2 and D3, as shown in more detail in FIG. 14.

The first chamber 8 is arranged on the outside and can be used to receive the guide and control and/or operating means for the first and the second roof section D1 and D2. The second chamber 9, however, which is arranged on the inside, can be used to receive guide and control and/or operating means for the third roof section D3. It is therefore possible to arrange the guide and control and/or operating means of the roof sections D1, D2, and D3 alternatively in the chambers 8 or 9.

The guide rails 2, 3 are covered under an outside roof contour K, and the receiving chambers 8 and 9 are arranged adjacent to each other.

The guide rails 2, 3 are connected with the body structure of the vehicle via the lateral rails 10 of the vehicle roof.

Figure 13:
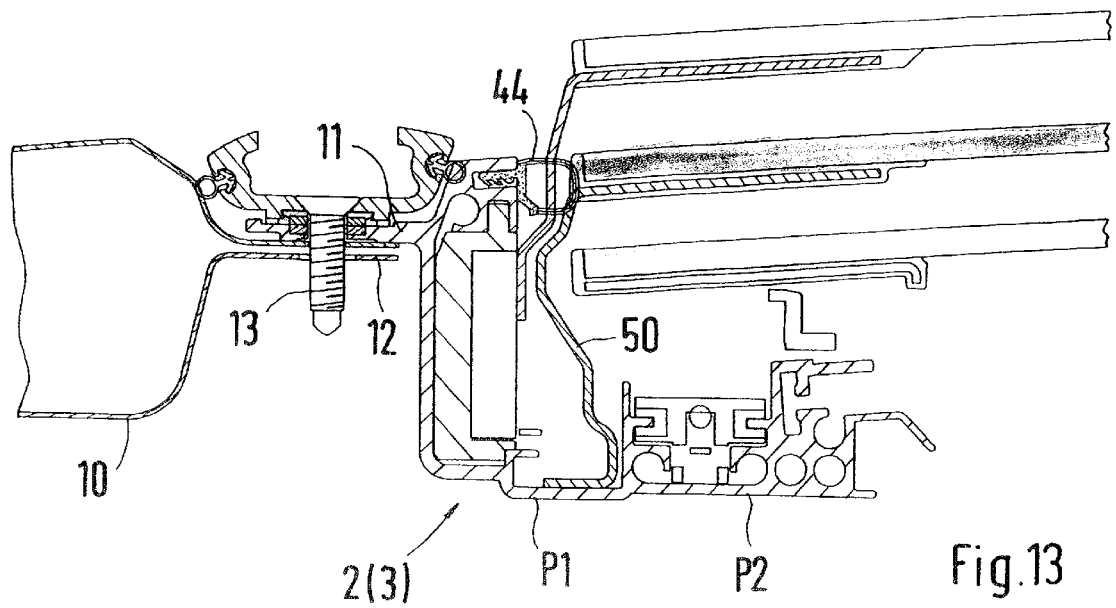
FIG. 13 is a section through the guide rail, including a screw connection on a lateral roof rail.

For that purpose, on the outside profile P1 forming the chamber 8, each of the guide rails 2, 3 has a horizontal bridge 11 running approximately horizontally and towards the outside of the vehicle which rests at least above a bridge 12 of the lateral rail 10, with which it is connected by means of screws 13, as shown in more detail in FIG. 13.

The control and operating means for lifting and lowering the movable roof section D2 to release and close the roof opening 4 and 7 comprise links 15, 16 with guide slots 17, 17a, and 18 that can be moved in the guide rail 2, 3, in which link pins 19, 20 permanently mounted on the respective roof sections are guided (FIGS. 9 and 14). In addition, a link 21 is provided for the first roof section D1, in whose guide slot 22 a roof-mounted link pin 23 engages and controls the swivel motion of the roof section D1.

The wind deflector plate and/or the first roof section D1 is controlled in such a way that the link (15) of the second roof section D2 moves against the driving direction F with free travel and swivels the wind deflector plate and/or the first roof section D1 before the roof section D2 moves into its opening position. After displacing the link 15 with respect to the link G 16, a lifting motion is carried out, as shown in more detail in FIG. 2. Afterwards, the links 15, 16 are displaced together against the driving direction in the guide rail 2, 3.

Figure 16:
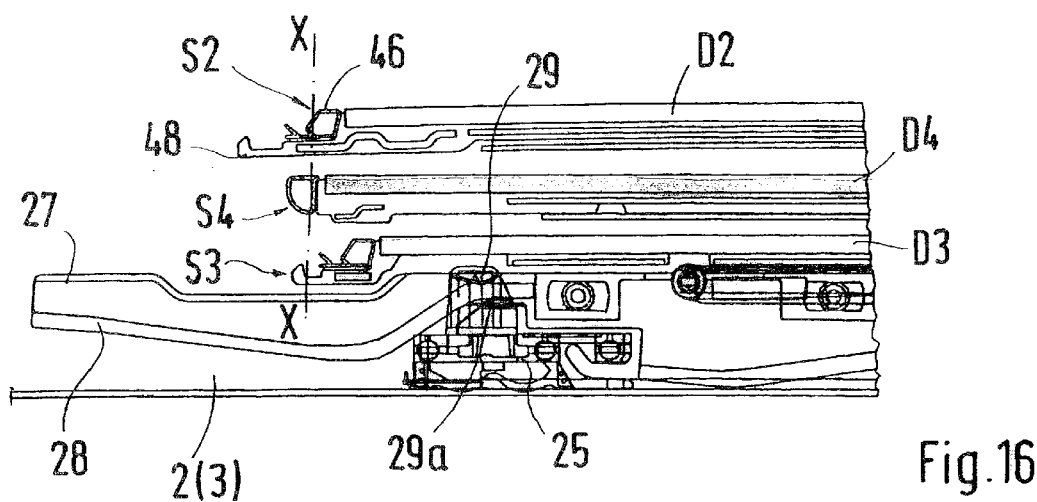
FIG. 16 is a schematic side view onto the last three superimposed roof sections, including seals for the front end edges.
Figure 17:
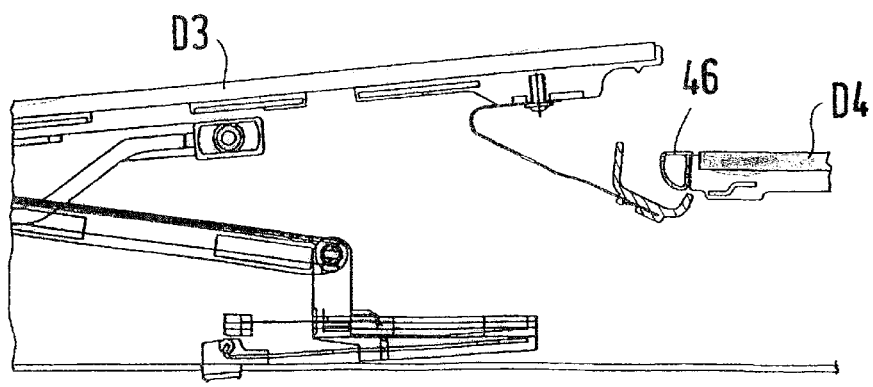
FIG. 17 is a side view onto the end edges seal from the third to the fourth roof section in a tilted position of the third roof section.

In the inside profile P2 of the guide rail 2, 3, sliding elements 25, 26 connected with a control element 27 of the roof section D3 can be displaced longitudinally (FIGS. 10, 16, and 19). The sliding elements 25, 26 are provided with a raised guide rail 28, 28a, with sliding cams 29, 29a partially going around such sliding elements in such a manner that, once the sliding elements 25, 26 are displaced along the guide rail 28, the roof section D3 is lowered vertically as well as displaced longitudinally.

In the guide rails 2, 3, a plurality of circular channels 30 are provided in which operating ropes or similar control means are disposed which drive the link 15, 16, 21 as well as the sliding elements 25, 26 to achieve a closing or opening position of the roof sections D1, D2, and D3.

By means of the links and control elements displaceable in the guide rail 2, 3 for the movable roof sections D1, D2, and D3, the roof sections can be moved into the positions described below.

During the release of the second roof section D2, this roof section is lifted vertically upwards, followed by a longitudinal motion against the driving direction F. The second roof section D2 assumes a position above the third roof section D3, with this third roof section D3 remaining flush with the permanently mounted fourth roof section D4.

During the release of the third roof section D3, this roof section is lifted vertically downwards, followed by a longitudinal motion F against the driving direction. The third roof section D3 assumes a position under the permanently mounted fourth roof section D4, with this second roof section D2 remaining in its position flush with the fourth roof section D4.

The second and the third roof sections D2 and D3 assume a position over and under the permanently mounted fourth roof section D4, with the front end edges S2 to S4 of all three roof sections D2, D3, and D4 being superimposed in an approximately vertical plane X—X.

The first roof section D1 is formed by the wind deflector plate, which is relatively narrow compared with the other roof sections. The roof sections can have different or the same lengths in such a way that the largest possible opening is provided by the roof sections D2 and D3.

In particular, the roof sections D1, D2, D3, and D4 can be made from a transparent material, e.g. glass, although a non-transparent material such as sheet metal, plastic or the like is also conceivable. A mixed. construction combining transparent and non-transparent roof sections is also possible.

Figure 12:
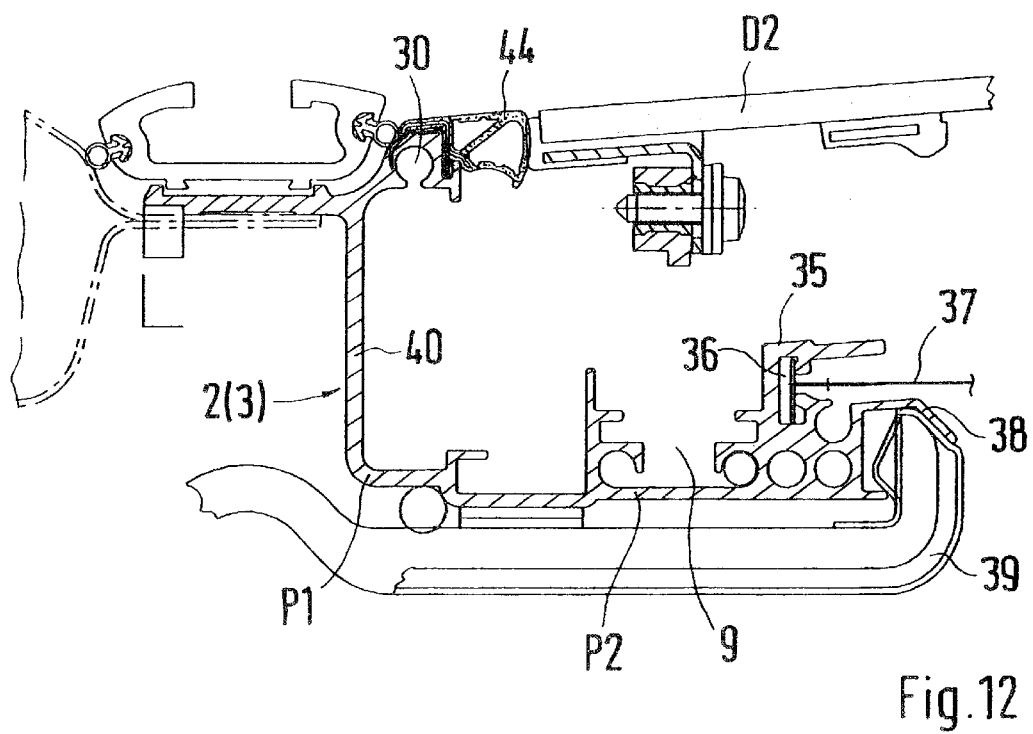
FIG. 12 is a section through the guide rail, including a fastening profile for a roof liner and a guide for a roll-up sun screen.

The inside profile P2 of the guide rail 2, 3 has profiled moldings 35 in the form of a groove 36 in which a roll-up sun screen 37 is guided laterally. Another profiled molding 38 is used to secure a roof paneling 39 (FIG. 12).

As shown in FIG. 11, on its outside profile P1, the guide rail 2, 3 is provided with an upward projecting side 40 (FIG. 11) extending at least laterally from the lateral edges of the roof sections D1, D2, D3, and D4, with the further sides 41 and 42 of the profiles P1 and P2 being located beneath the roof sections D2, D3, and D4.

In a preferred embodiment, on its free end, the upward projecting side 40 of the outside profile P1 of the guide rail 2, 3 has a chamber profile seal 44 facing the lateral edges S2, S3, S4 of the roof sections D2, D3, D4 which can be pushed aside by the link pins 19 in the area of a passing permanently roof-mounted holding element 45. Before and after this seal, the chamber profile again rests against the lateral edge to produce a sealing effect.

In the area of the edges S2, S3, S4 between the roof sections D1, D2, D3, and D4, opposite sealing strips 46, 47 are arranged. The first sealing strip 46 has an elastic hollow chamber profile, and the sealing strip 47 disposed opposite therefrom has a solid elastic profile. Beneath the hollow chamber profile, each carrier profile 48 provided with a transversal channel is connected with the roof section D2, D3, D4.

On the front transversal roof rail 49 of the body structure of the vehicle, a sealing strip 46, consisting e.g. of a hollow chamber profile, is arranged which is disposed to correspond to a sealing strip 52 at the front end edge S1 of the first roof section D1. This hollow chamber profile seals off the front roof section in a closed position; in an opening position, the free front end of the roof section D1 enters a transversal rail.

FIG. 20 shows the permanently mounted rear roof section D4 fastened onto the rear transversal roof rail 10a. By means of holding and fastening means 50, this permanently mounted roof section D4 is connected, on one hand, with the guide rail 2, 3 in the profile P1 on the bottom side and, on the other hand, a connection with the roof rail 10a is provided. This results in a significant increase of the stiffness of the construction, since the permanently mounted roof section D4 is directly integrated in the body structure.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A multipart sun roof for a motor vehicle comprising:
   a first roof section which can be moved at an angle,
   second and third moveable roof sections that can be longitudinally displaced in a longitudinal, direction of the vehicle for positioned closing and releasing of a roof opening, and
   a stationarily mounted fourth roof section adjacent to said moveable roof sections, with displacement of the longitudinally displaceable roof sections being controllable by control, displacement and operating elements,
      wherein the first roof section can be displaced at an angle with respect to the second roof section and the moveable second and third roof sections can be displaced both individually and independently from each other as well as successively into release and closed positions by links that are displaceable in guide rails as well as said control elements in such a way that the second and the third roof section each are arranged in a longitudinally displaceable manner in the guide rails to form respective roof openings and, as a result thereof, both of the moveable roof sections together release the roof opening, and at least one of the moveable roof sections can be displaced at an angle from a respective closed position, said control, displacement and operating elements including said links and said control elements,
      wherein, between lateral rails of a vehicle roof body structure, the guide rails are provided with at least two profiled receiving chambers for the displacement, control and operating elements of the first, second and third roof sections and are positioned beneath an exterior roof contour and are each connected with lateral rails of the body structure, and
      wherein the receiving chambers of the guide rails are arranged adjacent to each other in an approximately horizontal plane to laterally secure the roof sections.

2. A sun roof in accordance with claim 1, wherein during release of the second roof section, a vertically upward lifting motion of the second roof section is coupled with a subsequent longitudinal motion against the driving direction so that the second roof section is positioned above the third roof section or the fourth roof section , while the third roof section is arranged flush with the stationarily mounted fourth roof section.

3. A sun roof in accordance with claim 1, wherein, during release of the third roof section, a vertically downward lifting motion of the third roof section is coupled with a subsequent longitudinal motion against the driving direction so that the third roof section is displaceable under the stationarily mounted fourth roof section, while the second roof section is arranged flush with the fourth roof section.

4. A sun roof in accordance with claim 2, wherein, during release of the third roof section, a vertically downward lifting motion of the third roof section is coupled with a subsequent longitudinal motion against the driving direction so that the third roof section is displaceable under the stationarily mounted fourth roof section, while the second roof section is arranged flush with the fourth roof section.

5. A sun roof in accordance with claim 1, wherein each of the second and third roof sections can be moved into an angular position by the control, displacement, and operating elements.

6. A sun roof in accordance with claim 1, wherein the second and the third roof sections can be moved together over and under the mounted fourth roof section, respectively, to positions where front end edges of the second, third and fourth roof sections are superimposed in an approximately vertical plane.

7. A sun roof in accordance with claim 1, wherein the vehicle roof comprising the four roof sections with the guide rails as well as the control, displacement and operating elements is configured as a functional module that can be inserted into a vehicle roof opening as a prefabricated assembly which can be connected with front, rear, and lateral roof rails of the vehicle body structure.

8. A sun roof in accordance with claim 1, wherein the first roof section is narrower lengthwise compared with the other roof sections and forms a wind deflector plate.

9. A multipart sun roof for a motor vehicle comprising:
a first roof section which can be moved at an angle,
second and third moveable roof sections that can be longitudinally displaced in a longitudinal direction of the vehicle for positioned closing and releasing of a roof opening, and
a stationarily mounted fourth roof section adjacent to said moveable roof sections, with displacement of the longitudinally displaceable roof sections being controllable by control, displacement and operating elements,
wherein the first roof section can be displaced at an angle with respect to the second roof section and the moveable second and third roof sections can be displaced both individually and independently from each other as well as successively into release and closed positions by links that are displaceable in guide rails as well as control elements in such a way that the second and the third roof section each are arranged in a longitudinally displaceable manner in the guide rails to form respective roof openings and, as a result thereof, both of the moveable roof sections together release the roof opening, and at least one of the moveable roof sections can be displaced at an angle from a respective closed position, said control, displacement and operating elements including said links and said control elements,
wherein the guide rails comprise two profiles with approximately U-shaped cross sections, and
wherein one of said profiles is an outside profile which has a first chamber to receive the control, displacement and operating elements for the first and the second roof sections as well as to support the mounted fourth roof section via fasteners.

10. A sun roof in accordance with claim 9, wherein the other of said profiles is an inside profile of the guide rails which has a second chamber to receive the control, displacement and operating elements for the third roof section.

11. A sun roof in accordance with claim 1, wherein the guide rails include profiles forming a pair of chambers for receiving at least one of the control, displacement and operating elements for the first and second roof section and to receive at least one of control, displacement and operating elements for the third roof section.

12. A sun roof in accordance with claim 1, wherein the guide rails are provided with a guide system for a roll-up sun screen as well as with a receiving area to secure a roof paneling.

13. A sun roof in accordance with claim 1, wherein, on an outside one of the profiles of the respective guide rails, a bridge extending approximately horizontally and projecting towards an outside of the vehicle is provided which can be connected with at least one lateral rail of the vehicle body structure of the vehicle by screws.

14. A sun roof in accordance with claim 1,
wherein an outside one of the chamber profiles of the respective guide rails includes a projecting side which partially goes around the second, third and fourth roof sections, and
wherein an inside one of the chamber profiles of the respective guide rails is substantially arranged below the second, third and fourth roof sections.

15. A sun roof in accordance with claim 1,
wherein, on an outside one of the chamber profiles of the respective guide rails, the links for the first roof section or the second roof section are arranged in a longitudinally displaceable manner,
wherein a plurality of circular channels are provided in which operating cables are disposed, and
wherein link pins connected with the first and second roof section engage in guide slots of the links.

16. A sun roof in accordance with claim 1, wherein, in an inside one of the chamber profiles of the respective guide rails, two sliding elements connected with each other are arranged in a longitudinally displaceable manner which engage in guides of a control element connected on the third roof section.

17. A sun roof in accordance with claim 15, wherein, in an inside one of the chamber profiles of the respective guide rails, two sliding elements connected with each other are arranged in a longitudinally displaceable manner which engage in guides of a control element connected on the third roof section.

18. A sun roof in accordance with claim 1,
wherein, on a free end, projecting sides of an outside one of the chamber profiles of the respective guide rails are provided with a chamber profile seal facing edges of the roof sections, and
wherein said chamber profile seal can be pushed aside at least by the links in an area of a passing holding element permanently mounted on the roof sections.

19. A sun roof in accordance with claim 1,
wherein, in an area of edges between the roof sections, opposite sealing strips are arranged, and
wherein one of the sealing strips has an elastic profile and another sealing strip disposed opposite therefrom has a solid elastic profile, and beneath the strips a hollow chamber profile provided with a transversal channel is connected with the roof sections.

20. A sun roof in accordance with claim 1, wherein at least on a front transversal roof rail of the body structure of the vehicle, a sealing strip comprising a profile is arranged which is disposed to correspond to a sealing strip at a front end edge of the first roof section.

21. A sun roof in accordance with claim 1, wherein the roof sections all are different in length so that the first roof section provided in front as a wind deflector plate is shorter than the other roof sections, and the second roof section is longer than the third roof section, and the mounted roof section is longer than any other roof section.

* * * * *